United States Patent [19]

Brown et al.

[11] 4,017,707
[45] Apr. 12, 1977

[54] METHOD OF AND MEANS FOR SPACING CONTROL OF PLASMA ARC TORCH

[75] Inventors: Ronald D. Brown, Morton; Billy L. Stolin, Mundelein, both of Ill.

[73] Assignee: Caterpillar Tractor Co., Peoria, Ill.

[22] Filed: Dec. 4, 1974

[21] Appl. No.: 529,324

[52] U.S. Cl. .......................... 219/121 P; 219/124
[51] Int. Cl.² ....................................... B23K 9/10
[58] Field of Search ...... 219/137 PS, 131 F, 131 R, 219/131 WR, 135, 124, 125 R, 121 P; 315/111.2

[56] References Cited

UNITED STATES PATENTS

| | | | |
|---|---|---|---|
| 3,233,076 | 2/1966 | Vilkas | 219/131 F |
| 3,262,006 | 7/1966 | Sciaky et al. | 219/125 R |
| 3,443,057 | 5/1969 | Allen et al. | 219/131 R |
| 3,538,299 | 11/1970 | Daggett | 219/131 F |
| 3,564,333 | 2/1971 | Cramer et al. | 219/135 |
| 3,596,050 | 7/1971 | Tikijian | 219/124 |
| 3,777,115 | 12/1973 | Kazlauskas et al. | 219/137 R |

FOREIGN PATENTS OR APPLICATIONS

1,913,126  11/1969  Germany ......................... 219/125

*Primary Examiner*—Arthur T. Grimley
*Assistant Examiner*—Clifford C. Shaw
*Attorney, Agent, or Firm*—Phillips, Moore, Weissenberger, Lempio & Majestic

[57] ABSTRACT

A method of automatically maintaining a selected spacing for a plasma arc torch from a workpiece is disclosed which takes advantage of the fact that at any given setting of a plasma arc power supply the current in the arc varies inversely and the voltage across the arc varies directly in relation to the spacing of the plasma arc torch from the workpiece. According to such method, the current and voltage of the power supply for the torch are sensed in operation, a signal representative of each comparable to the other is generated and one of such signals is inverted with respect to the other of such signals. The signals are then summed with each other and with a third comparable selectively adjustable signal and the difference signal is used to control the spacing of the torch from the workpiece. A preferred embodiment of the control means for practicing the invention is described as included in a commercial plasma arc apparatus and includes means for shutting down the apparatus if an extreme condition occurs such as reaching the end of the workpiece or extinguishment of the arc. Means for protecting the control means during ignition of the arc, for enabling manual control of the plasma arc torch and for interfacing between the control means according to this invention and prior art control means are disclosed.

8 Claims, 3 Drawing Figures

METHOD OF AND MEANS FOR SPACING CONTROL OF PLASMA ARC TORCH

BACKGROUND OF THE INVENTION

This invention relates to a method of and means for controlling the height of a plasma arc torch above a workpiece and more particularly to such a method and means specifically designed to automatically maintain a selected height of the plasma arc torch above the workpiece during actual operation by sensing conditions present within the arc itself to effect the desired control.

A plasma cutting torch makes use of a high voltage, high current, DC arc that is established between the torch head and the working surface in a stream of gas thereby ionizing the gas and producing the desired plasma. Initial ionization of the gas is most conveniently accomplished by the application of a short duration, high frequency, high voltage pulse across a portion of the path of the gas flow within the torch head. After such pulse has established a high frequency arc within the torch head the flow of gas and the DC potential between the torch head and the workpiece will cause the arc column to stretch and extend beyond the nozzle so that when the torch is properly positioned with respect to the surface of the workpiece the arc transfers to the work surface and is maintained by the high DC potential between the torch head and the workpiece. The high frequency, high voltage source is, of course, disconnected from the torch as soon as the DC arc has been established between the torch and the workpiece. Although other means may be employed for initial ionization of the gas flow between the torch and the workpiece, the above described transferred arc system is typical of most commercially available plasma arc cutting torches.

The quality of the cut produced by a plasma arc torch is primarily dependent upon three variables:
1. DC power (voltage and current);
2. gas pressure;
3. torch to work distance.

The first two variables are reasonably well controlled in most commercial plasma arc cutting torch systems. However, torch to workpiece distance is difficult to maintain when cutting workpieces having warped or uneven surfaces. It is important that this variable also be closely controlled because proper torch to work spacing not only permits cleaner and more accurate cuts but also allows higher cutting speeds and reduces the objectionable noise attendant to all plasma arc cutting processes.

Most commercial plasma arc cutting torch systems are provided with torch height controls as part of the standard equipment. In the prior art these controls have employed capacitive, eddy current, pneumatic, etc. sensors. These types of controls and sensors are reliable as positioning means in the absence of any external disturbing factors and are useful in plasma arc systems in establishing approximate torch to workpiece spacing prior to initiation of the cutting operation. However, once the cutting operation is initiated by establishment of the plasma arc, conditions arise which render such controls and sensors unacceptable as a means to maintain the proper distance between the torch and surface of the workpiece. This is particularly true in systems using a water stabilized arc and a water muffler system since various highly turbulent electrical and mechanical effects are set up in the area between the torch and surface of the workpiece (as well as on the surface), not only by the plasma arc itself but also by the water system which will seriously degrade the function of height controls employing the above mentioned types of sensors.

It will be understood that the above mentioned types of sensors must be located in close spaced relation to the plasma arc torch above the surface of the workpiece and that they are inherently expensive in order to be sensitive enough for effective operation. Thus, not only must they be located in a position where they will be most subject to the turbulence effects mentioned above, but they will also be exposed to damage in the harsh shop environment in which plasma arc cutting systems are used.

It is an object of this invention to provide a method of and means for automatically maintaining a selected height of a plasma arc torch above the surface of a workpiece which will not be affected by external disturbances or turbulence effects present at and about the plasma arc cutting torch in operation.

It is a further object of this invention to provide a method of and means for automatically maintaining a selected height of a plasma arc cutting torch above the surface of a workpiece without the necessity of employing sensors physically located in close proximity to the plasma arc torch.

According to the method and means of this invention information is obtained from the plasma arc torch power supply that is directly related to conditions within the plasma arc itself. Such information is utilized to effect the desired control of the height of the plasma arc torch above the surface of the workpiece. Thus the method of this invention avoids the effects of external disturbances and turbulence present at and about the plasma arc torch which do not directly affect the plasma arc itself and the means may be physically located in close proximity to the power supply for the plasma arc torch where it can be protected from physical damage and provided with appropriate isolation means to protect it from transient electrical effects and other disturbances and turbulences.

SUMMARY OF THE INVENTION

Briefly, according to this invention, a selected spacing between a plasma arc torch and the work surface of a workpiece is maintained after an arc has been established therebetween by electrically sensing the voltage and current present between the workpiece and the torch and generating comparable first and second electrical signals representative of each respectively. One of such first and second electrical signals is electrically inverted with respect to the other and then electrically summed therewith to produce a composite signal representative of the difference therebetween. A third comparable electrical signal is electrically generated which is equal to the sum of the inverted signal and the other signal when the plasma arc torch is at the selected spacing from the work surface of the workpiece and such third signal is summed with the composite signal to produce an electrical control signal representative of the difference therebetween. The control signal is applied to electromechanical means coupled to the plasma arc torch to move the plasma arc torch toward the selected spacing from the work surface in response to the control signal. The means for practicing the invention includes a DC power supply, means for sensing the output current and voltage of the power supply to generate comparable first and second electrical signals representative thereof, means for generating the third electrical signal, means for summing the first, second and third electrical signals to produce the electrical control signal, electromechanical means for moving the plasma arc torch toward and away from the work surface of the workpiece, and means for applying the control signal to the electromechanical means to cause the plasma arc torch to move toward the selected spacing thereof from such work surface.

BRIEF DESCRIPTION OF THE DRAWING

The foregoing and other objects and features of the subject invention will be more clearly apparent from a reading of the following description of the preferred embodiment of this invention in conjunction with the attached drawing wherein.

DESCRIPTION OF PREFERRED EMBODIMENT

Figure 1:
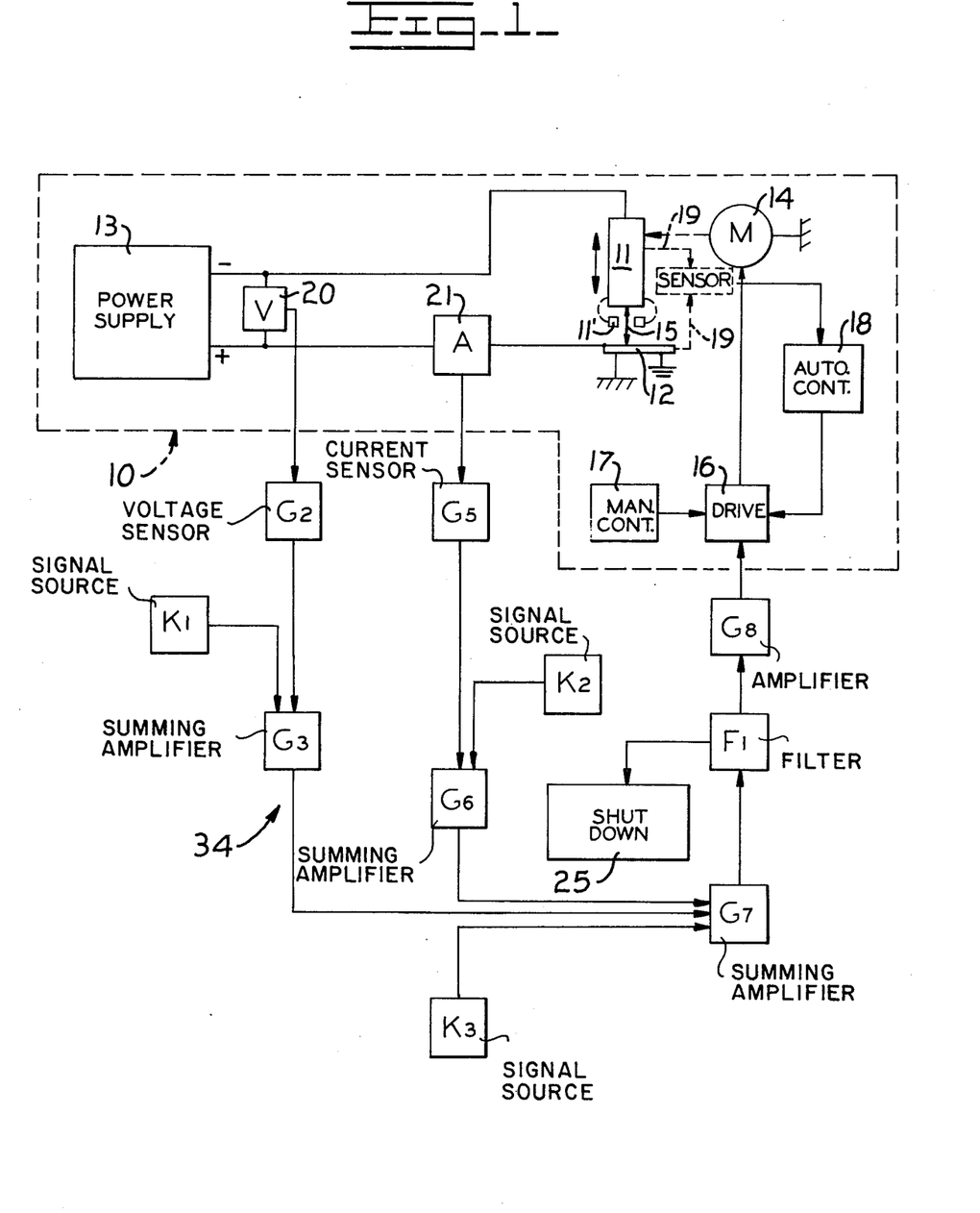
FIG. 1 is a functional block diagram of the method and means of this invention as applied to a plasma arc cutting torch system.

Referring to FIG. 1, a block diagram of the electrical elements of a conventional plasma arc cutting torch system is shown within the dotted lines 10 with the functional elements in accordance with the teaching of this invention shown outside the dotted lines 10. Thus, a conventional plasma arc torch 11 is shown spaced from the surface of a workpiece 12 with the torch 11 and the workpiece 12 each electrically connected to a different one of the output leads of a conventional commercially available DC power supply 13. The spacing between the torch 11 and the surface of the workpiece 12 is controlled by an electromechanical device such as a servomotor 14 mechanically connected therebetween. The torch 11 may include a starter electrode 11' insulated from the body thereof and to which a high voltage, high frequency pulse may be applied with respect to the main body of the torch 11 from a source (not shown in FIG. 1) to ignite the plasma arc. Once the plasma arc has been ignited between the body of the torch 11 and the starter electrode 11', it will be transferred to the workpiece 12 by the DC voltage established by the power supply 13 across the gap 15 between the torch 11 and the workpiece 12. DC current flow through the plasma arc across the gap 15 will maintain the arc to produce heating of the workpiece 12 and enable the desired cutting, welding or other operation to be performed thereon.

It will be understood that the plasma arc torch 11 is connected to a pressurized source of a selected gas (not shown) for establishing a flow of such gas across the gap 15 between the torch 11 and the workpiece 12 in which the plasma arc is formed. Such gas may be selected to provide an oxidizing action in performing cutting operations or an inert gas, or a gas having some other particular property, may be selected for use in performing other operations. Commercially available machines also provide means (not shown) for stabilizing the arc and for muffling the noise made by the arc in operation, using a water or gas sheath for example.

As pointed out hereinabove, the quality of the cut or other operation to be performed by the plasma arc torch 11 is dependent upon the establishment and maintenance of the proper DC power output from the power supply 13, the proper gas flow through the torch 11 and the proper spacing or gap 15 between the torch 11 and the surface of the workpiece 12. Thus the power supply 13 of commercially available plasma arc torch systems is provided with appropriate controls (not shown) for setting the power supply 13 to provide a given percentage of rated power output and appropriate valves are provided at the pressurized source of gas (not shown) for setting a given gas flow through the torch 11. Similarly, a means for setting the spacing 15 between the torch 11 and the workpiece 12 comprising an electrical means 16 for driving the servomotor 14 and a manual control 17 for the driving means 16 is provided in commercially available plasma arc torch systems 10.

As mentioned above, the plasma arc torch system 10 may also include an automatic spacing control 18 electrically connected to the driving means 16 and including sensors physically and mechanically associated with the torch 11 and workpiece 12, as indicated by the dotted lines 19. However, as also mentioned hereinabove, it has been found that such prior art automatic spacing control means 18 become substantially inoperative once the plasma arc between the torch 11 and the workpiece 12 has been ignited and the functional blocks outside the dotted line 10 show the method of and means for automatically controlling the spacing between the torch 11 and the workpiece 12 after the arc has been ignited in accordance with the teaching of this invention.

As soon within the dotted line 10 in FIG. 1, conventional plasma arc systems include a voltmeter 20 connected across the output leads of the power supply 13 and an ammeter 21 interposed in one of the output leads of the power supply 13. Thus, in operation, the output of the power supply 13 is manually set to the value required to perform the desired operation on a particular workpiece. It will be understood that the thickness of the workpiece and the heating thereof required to perform the desired operation, as well as the desired processing time, all enter into determining the value of the percentage of rated output to which the power supply is set. The actual heating of the workpiece 12 is, of course, a function of the current flow through the plasma arc at the particular power setting and such current flow as indicated by the ammeter circuit 21 will be a function of the particular power supply 13, the particular plasma arc torch 11, the particular gas used as well as its pressure, and the spacing 15 between the torch 11 and the workpiece 12. Thus the gas flow through the torch 11 and the spacing of the gap 15 between the torch 11 and the workpiece 12 are set for maximum energy transfer to the workpiece. Once the system has been properly adjusted for the performance of a particular cutting or other operation on the workpiece 12, it is only necessary to maintain the proper spacing of the gap 15 to insure efficient operation of the system. It will be understood that most operations will require relative movement between the torch 11 and workpiece 12 and that if the workpiece 12 is warped or has an uneven surface, the length of such gap 15 will be subject to change in operation.

The method and means of the subject invention is based on the fact that the current flow through the plasma arc will vary inversely with the length of the gap 15 established by the spacing of the torch 11 from the workpiece 12 while the power supply voltage is directly proportional to gap length. According to the teaching of this invention as shown in FIG. 1, the output voltage of the power supply 13 is sensed by a first means indicated by the block $G_2$ connected across the output leads of the power supply 13 in parallel with the voltmeter 20 and the current flow through the plasma arc is sensed by a second means indicated by the block labeled $G_5$ connected in parallel with the ammeter 21. The sensor means $G_5$ and $G_2$ are each adapted to produce an electrical signal representative of the current and voltage respectively sensed thereby and one of such means is adapted to produce an electrical signal of inverted sense with respect to the electrical signal produced by the other such means.

According to the specific embodiment of this invention to be described herein, the electrical signal produced by the sensor $G_2$ becomes more positive as the voltage output of the power supply 13 increases, whereas the electrical signal produced by the sensor $G_5$ becomes more negative as the current flow through the plasma arc increases. It will be understood that the input to the sensor $G_2$ will differ greatly in magnitude from the input to the sensor $G_5$. However, in accordance with the method of this invention, it is necessary that the signal representative of the output voltage of the power supply be comparable in magnitude to the signal representative of the current which passes through the plasma arc both with respect to a common reference. To this end the signal produced by the sensor $G_2$ is combined with a reference signal from a source $K_1$ for amplification in amplifier $G_3$. Similarly the signal produced by the sensor $G_5$ is combined with a reference signal provided by source $K_2$ for amplification in summing amplifier $G_6$. The reference signals provided by sources $K_1$ and $K_2$ and the gain of amplifiers $G_3$ and $G_6$ are selected so that the outputs of amplifiers $G_3$ and $G_6$ are comparable to each other in terms of magnitude although of opposite sign or sense.

According to the method of this invention, the amplified signals produced by amplifiers $G_3$ and $G_6$ are combined and tend to cancel each other out due to the fact that they are of opposite sign or sense. A further reference signal from source $K_3$ having a sign or sense corresponding to that of one of the amplified signals from amplifiers $G_3$ and $G_6$ is also combined with such amplified signals. It will be understood that the sources $K_1$, $K_2$ and $K_3$ of reference signals are all related to each other and in fact, as will be described more fully hereinafter, all have a common source or power supply. Thus, the reference signal supplied by source $K_3$ will be comparable to the amplified signals from amplifiers $G_3$ and $G_6$ and as a result a combined signal will be produced which may be used to control the spacing between the plasma arc torch 11 and the workpiece 12.

As shown in FIG. 1, the combined signal is produced and is amplified in summing amplifier $G_7$. The output of summing amplifier $G_7$ passes through a filter $F_1$ and is further amplified in amplifier $G_8$. The output of amplifier $G_8$ is used to control the electrical drive circuit 16 for the servomotor 14 which in turn controls the spacing between the plasma arc torch 11 and the workpiece 12. The filter circuit $F_1$ is adapted to remove AC components in the output of the amplifier $G_7$ and to activate a circuit 25 designed to shut down the operation of the plasma arc torch system 10 if such output changes radically.

Thus, assuming that the power supply 13 has been set to provide a given output, an amplified voltage signal proportional to the length of gap 15 will be produced by the amplifier $G_3$ produced. A given current flow will occur through the arc, the magnitude of which will be a function of and inversely proportional to the length of the gap 15 between the torch 11 and workpiece 12 and an amplified signal representative of the magnitude of such current flow will be produced by the amplifier $G_6$. Since the amplified signals produced by amplifiers $G_3$ and $G_6$ are comparable to each other, it is possible that the two signals will be exactly equal to each other and will cancel each other out. In this case, an electrical signal will be produced by summing amplifier $G_7$ which is proportional to the full amount of the reference signal applied thereto from source $K_3$. Such signal will be amplifier by amplifiers $G_8$ and through the action of the driver circuit 16 and servomotor 14 will cause the torch 11 to move either toward or away from the workpiece 12. However, as soon as the torch 11 moves with respect to the workpiece 12, the current and voltage of the arc will change in opposing relationship depending on the direction of such movement. Such change in the current and voltage of the plasma arc will change the magnitude of the amplified signals applied by amplifiers $G_3$ and $G_6$ to summing amplifiers $G_7$ and will therefore change the electrical signal applied to the amplifier $G_8$ for amplification.

In actual operation, the desired spacing between the plasma arc torch 11 and the workpiece 12 is set manually. The reference signals provided by sources $K_1$, $K_2$ and $K_3$ are then adjusted so that the difference between the amplified signals produced by amplifiers $G_3$ and $G_6$ is equal in magnitude and opposite in sign to the reference signal provided by the source $K_3$ resulting in the absence of any control signal to the amplifier $G_7$ from the junction 24. Let us now consider the amplified signal produced by amplifier $G_3$ representative of the output voltage of the power supply 13 to be a "negative" signal becoming more negative as the output voltage of the power supply 13 increases and the amplified signal produced by amplifier $G_6$ representative of the current flow in the plasma arc to be a "positive" signal, becoming more positive as such current increases. Let us further consider the reference signal supplied by the source $K_3$ to be a "positive" signal. Thus, if the current flow through the arc increases, the positive signal produced by the amplifier $G_6$ will increase and the negative signal from amplifier $G_3$ will go less negative. This results in the application of a positive signal to the amplifier $G_7$. On the other hand, if the current flow in the arc decreases, the positive signal produced by the amplifier $G_6$ will decrease and the negative signal from the amplifier $G_3$ will go more negative. This results in a negative signal applied to the amplifier $G_7$. The drive circuitry 16 may then be adapted so that the application of a negative signal to the amplifier $G_7$ for further amplification by amplifier $G_8$ will result in the servomotor turning in the proper direction to decrease the spacing between the torch 11 and the workpiece 12, whereas the application of a positive signal to the drive circuit 16 through amplifiers $G_7$ and $G_8$ will result in the servomotor 14 turning in the proper direction to increase the spacing between the torch 11 and the workpiece 12. Thus, once the proper spacing between the torch 11 and the workpiece 12 has been established and the arc initiated, any change in such spacing will cause the torch to be moved with respect to the workpiece toward the proper spacing therebetween.

It will be understood that the means for practicing the method according to the teaching of this invention will not be operable unless the plasma arc has been ignited. Furthermore, it has been found that the means for practicing the method according to the teaching of this invention must be carefully protected against transient electrical effects which may occur during the period when the plasma arc is being ignited by the application of the high frequency, high voltage ignition pulse. Thus, referring to FIG. 2, a wiring diagram showing the interconnection of the means for practicing the method of this invention with the circuitry of a conventional plasma arc torch system 10' is shown. The plasma arc torch power supply is shown in block form at 13. Similarly, the power supply 31 for the plasma arc sequence control 30 and the power supply 32 for the means for practicing the teaching of this invention are shown in block form. Finally, the electronic circuit 34 of the means for practicing the teaching of this invention is shown in block form in FIG. 2 as connected to the power supply 32 by means of appropriate relay logic 33. The relay logic 33 is operated by two relays TR5 and CR5 which have been added to the sequence control circuitry 30 in order to coordinate the function of the electronic circuitry 34 with the system 10' as is more fully described hereinbelow.

Figure 2:
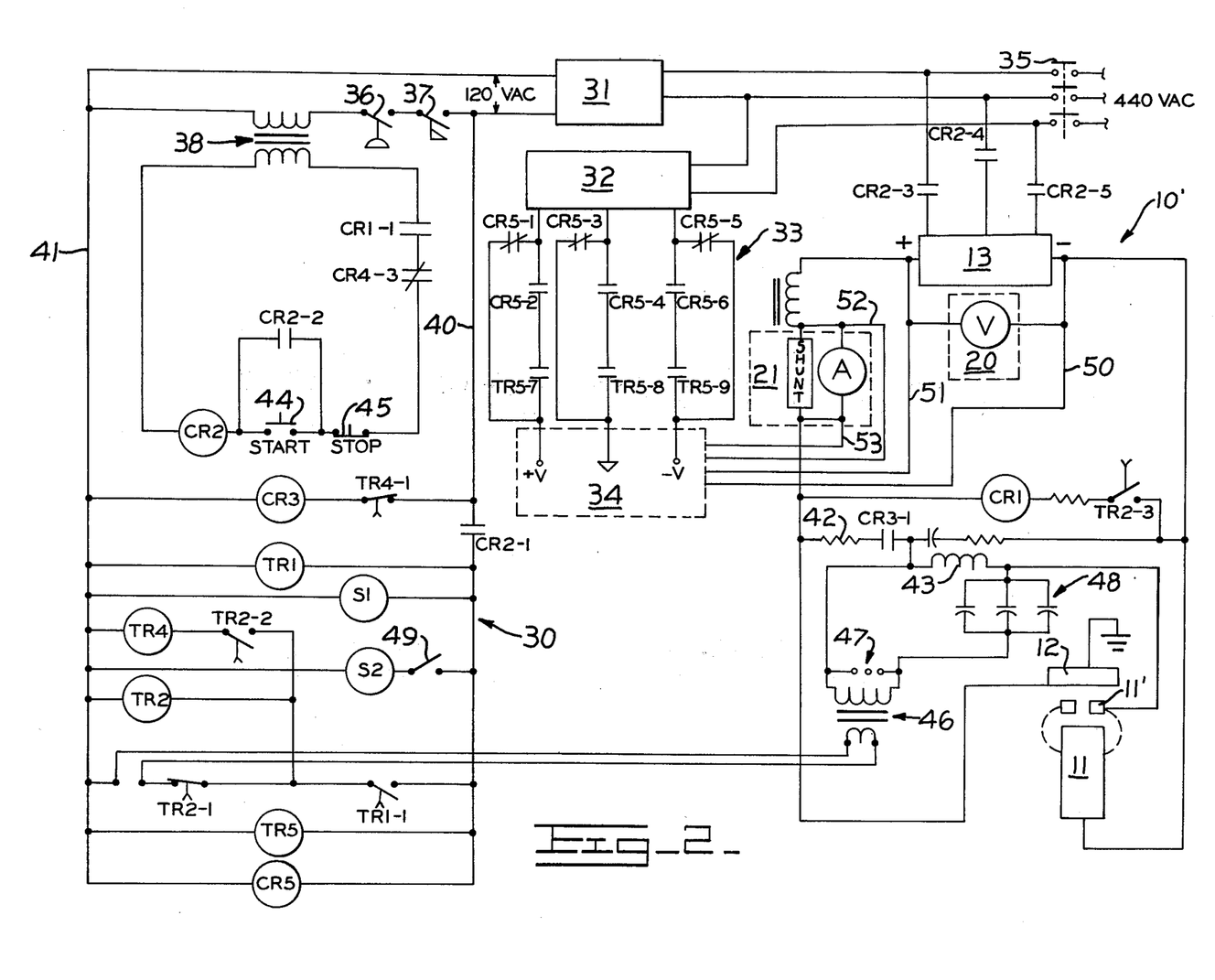
FIG. 2 is a wiring diagram for a plasma arc cutting torch system as adapted to include means for practicing the method of torch spacing control according to the teaching of this invention with certain elements of the system shown schematically and others shown in block form.

The plasma arc system 10' is enabled by closing a circuit breaker 35 interposed between the system 10' and a three-phase 440 volt AC line. When circuit breaker 35 is closed, power is provided to the sequence control power supply 31 and to the power supply 32. The power supply 32 provides power to the electronic circuit 34 through normally closed contacts associated with the relay CR5, namely, contacts CR5-1, CR5-3 and CR5-5. However, the plasma torch power supply 13 is disconnected from the circuit breaker 35 by normally open contacts of relay CR2 of the sequence control system 30 namely, contacts CR2-3, CR2-4 and CR2-5. This permits the electronic circuit 34 to warm up and thereby thermally stabilize prior to arc initiation to minimize drift that might otherwise occur immediately following the start up of the system.

Referring now to the plasma arc sequence control 30, a normally open pressure switch 36 and a normally open gas flow switch 37 are connected in series with each other and with the primary of a transformer 38 across the output of the sequence control power supply 31. The pressure switch 36 is closed by opening a water supply valve (not shown) associated with the system 10' and the gas flow switch 37 is closed by opening the valve (not shown) between the source of pressurized gas and the plasma arc torch 11. A relay CR3 is connected in series with the normally closed contact TR4-1 of a further relay across the output of the sequence control power supply 31. Thus, upon closure of the circuit breaker 35 the relay CR3 is activated to close normally open contacts CR3-1 thereof in the plasma arc ignition circuit. Closure of contacts CR3-1 completes a circuit from the positive lead of the plasma torch power supply 13 through a resistor 42 and inductance 43 to the starting electrode 11' of the torch 11. The negative lead of the power supply 13 is connected directly to the torch 11. Thus, when the power supply 13 is later activated, this circuit establishes a DC potential between the starting electrode 11' and the torch 11 that serves to assist the ignition of the plasma arc by the application of high frequency, high voltage therebetween, as will be more fully described below.

Referring again to the sequence control 30, a normally open "Start" switch 44 is connected in series with a normally closed "Stop" switch 45 and a relay CR2 across the secondary winding of the transformer 38 through normally closed contacts CR1-1 and CR4-3. Thus, the closure of the "Start" switch 44 will actuate the relay CR2 which has five normally open contacts. The first of such normally open contacts CR2-1 is interposed in one of the output leads 40 of the sequence control power supply 31 beyond the relay CR3 and another of such contacts CR2-2 is connected across the "Start" switch 44. The three remaining normally open contacts CR2-3, CR2-4 and CR2-5 are interposed between the three lines of the three-phase 440 volt AC source and the plasma arc torch power supply 13. Thus, activation of the relay CR2 energizes the balance of the sequence control 30 as well as the plasma arc torch power supply 13 and at the same time bypasses the normally open "Push to Start" switch 44 so that the system 10' will remain operational upon release of the "Start" switch 44.

The closure of normally open contact CR2-1 energizes timing relays TR1 and TR5 causing them to begin their respective cycles and at the same time energizes relay CR5. Energization of relay CR5 opens normally closed contacts CR5-1, CR5-3 and CR5-5 to deenergize electronic circuit 34 of the means for practicing the method of this invention. However, energization of relay CR5 simultaneously closes normally open contacts CR5-2, CR5-4 and CR5-6 in order to prepare the relay logic system 33 for reactivation of the electronic control circuit 34 when the timing relay TR5 has completed its cycle.

The cycle of timing relay TR5 is selected to time-out after approximately 4.5 seconds thus permitting time for the plasma arc to be established between the torch 11 and the workpiece 12 before the electronic control circuit 34 is again energized. It will be understood that since a burst of high frequency, high voltage energy is required to establish the plasma arc, the sensitive inputs to the electronic control circuit 34 must be protected until the arc is established and the high frequency, high voltage pulse discontinued. To this end, timing relay TR5 is provided with normally open contacts TR5-7, TR5-8, TR5-9 in the logic relay circuit 33 as well as additional normally open contacts within the electronic control circuit 34 itself, as will be more fully described in connection with FIG. 3.

The closure of normally open contacts CR2-1 also energizes a solenoid S1 in the sequence control circuit 30 which solenoid opens a gas valve to connect the plasma arc torch to the source of pressurized gas. Thus, gas flow is established through the plasma arc torch 11 during the time cycle of timing relay TR1.

According to this embodiment of the invention, the time cycle of TR1 times-out at the end of two seconds at which point it closes normally open contacts TR-1 thereof to start timing relay TR2 and simultaneously connect the primary winding of the ignition transformer 46 across the output leads 40, 41 of the sequence control power supply 31. A spark gap device 47 is connected across the secondary leads of the ignition transformer 46 and cooperates with a parallel array 48 of capacitors and inductor 43 to generate the high frequency, high voltage ignition pulse which is applied between the starting electrode 11' and the plasma arch torch 11.

The length of such starting pulse is determined by the time cycle of the timing relay TR2. According to this embodiment of the invention, the time used to ionize the plasma gas and initiate the plasma arc is approximately one second. At the end of one second the timing relay TR2 times-out opening normally closed contacts TR2-1 thereof to discontinue the high frequency, high voltage ignition pulse.

Simultaneously, the normally open contacts TR2-2 of the timing relay TR2 are closed to initiate the timing cycle of timing relay TR4. In addition, the timing-out of timing relay TR2 closes normally open contacts TR2-3 thereof to connect the relay CR1 across the output leads of the plasma arc torch power supply 13 in parallel with the gap between the plasma arc torch 11 and the workpiece 12. If the plasma arc has been established between the plasma arc torch 11 and the workpiece 12, the current flow through relay CR1 will not be sufficient to actuate it. However, if the plasma arc has not been established, then the current flow through relay CR1 will cause it to operate opening the normally closed contacts CR1-1 thereof which are connected in series with the secondary of the transformer 38 to effect complete system shut-down before timing relays TR4 and TR5 can operate.

Assuming that the plasma arc has been established between the plasma arc torch 11 and workpiece 12, then according to this embodiment of the invention, timing relay TR4 will time-out one second after timing relay TR2. At the end of its cycle, timing relay TR4 will open normally closed contacts TR4-1 thereof thereby deenergizing relay CR3 and allowing normally open contacts CR3-1 thereof to return to their open position thereby removing the DC potential from the starting electrode 11'. By this time the plasma arc will have transferred to the workpiece and the high voltage DC across the gap between the plasma arc torch 11 and the workpiece 12 will maintain such arc.

The timing relay TR5 will complete its cycle after an additional 0.5 second and then applies power to the electronic circuit 34 of the means for practicing the teaching of this invention by closing normally open contacts TR5-7, TR5-8 and TR5-9 thereof. In addition, timing relay TR5 actuates eight sets of contacts within the electronic circuit 34 as will be more fully described hereinafter in connection with FIG. 3. The system is now ready to operate and manual operation of normally open switch 49 will energize the water control solenoid S2 to operate a water valve and supply water to the torch 11 for cooling, arc shielding and/or water muffling.

At this point attention is directed to leads 50 and 51 which connect the output of the plasma arc torch power supply 13 to the electronic circuitry 34 of the means for practicing the teaching of this invention. Such leads may conveniently be connected at opposite ends of the voltmeter 20 normally included in conventional plasma arc torch power supplies and will thus apply the full power supply voltage to the electronic circuit 34. Similarly, leads 52 and 53 may be conveniently connected from opposite sides of the ammeter circuit 21 normally included in conventional plasma arc torch power supplies to the electronic circuit 34. Thus the leads 52 and 53 will apply a voltage representative of the current flow through the plasma arc between the torch 11 and the workpiece 12 to the electronic circuit 34. It will be understood that if an ammeter circuit 21 is not included in the power supply for the plasma arc torch, then an appropriate equivalent thereof must be interposed in one of the leads of the power supply 13.

Figure 3:
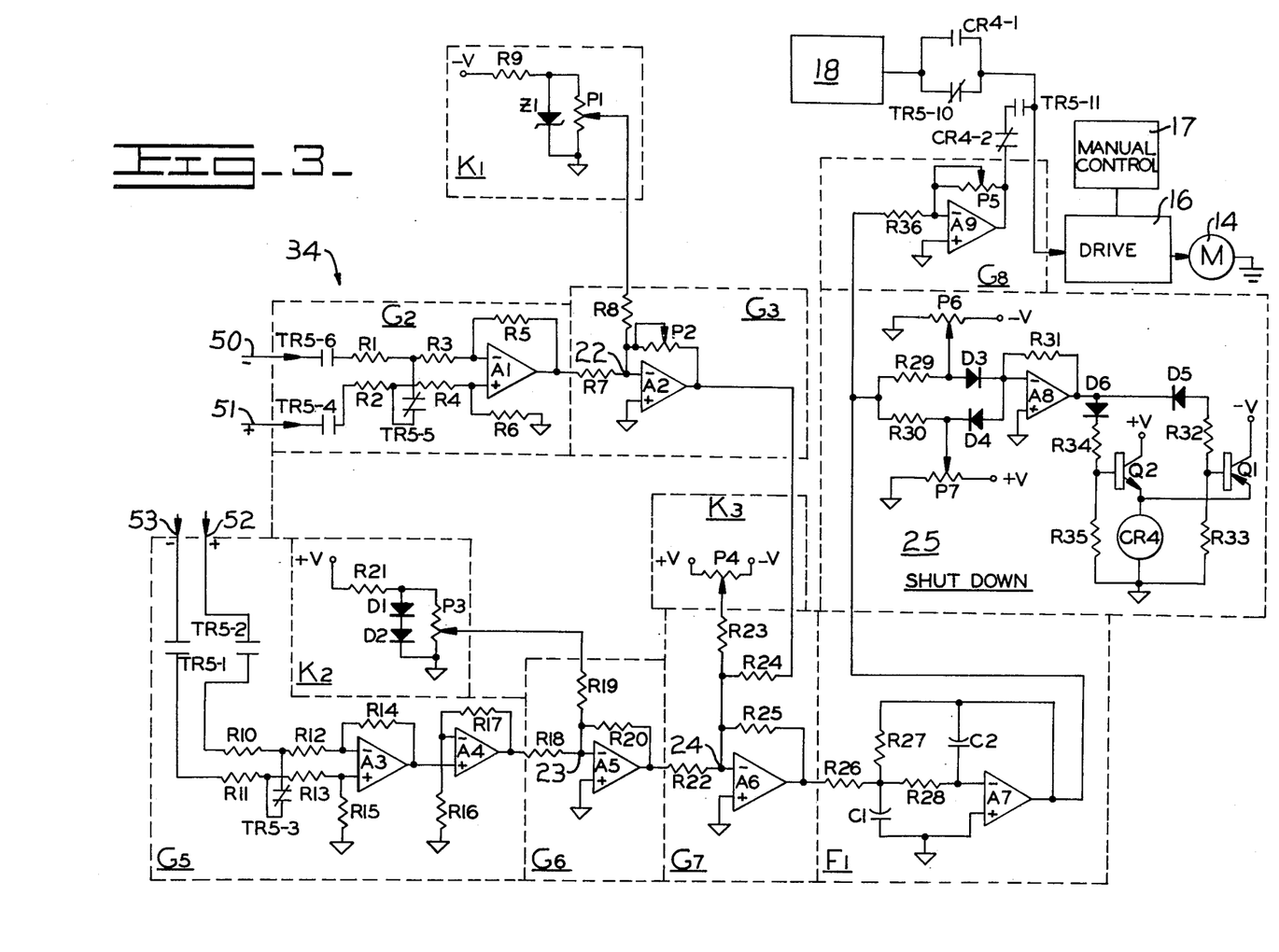
FIG. 3 is a schematic diagram of the means for practicing the method according to the teaching of this invention with certain conventional elements of the plasma arc cutting torch system shown in block form.

Referring now to FIG. 3, the electronic circuitry 34 of the means for practicing the teaching of this invention is shown schematically. Dotted lines have been used to indicate the portions of the schematic which correspond generally to the blocks discussed in connection with FIG. 1 in terms of function. In addition, reference numerals used in FIGS. 1 and 2 have been used in FIG. 3 in order to facilitate a full understanding of FIG. 3.

Thus, it will be seen that the voltage sensor means $G_2$ includes a differential amplifier $A_1$ and that the current sensor means $G_5$ includes a differential amplifier $A_3$ and an operational amplifier $A_4$. The leads 50 and 51 from the output of the plasma arc torch power supply 13 are connected to the inputs of the differential amplifier $A_1$ through normally open contacts TR5-6 and TR5-4 of timing relay TR5, respectively. Similarly, the leads 52 and 53 are connected to the inputs of differential amplifier $A_3$ of the current sensor means $G_5$ through normally open contacts TR5-1 and TR5-2 of timing relay TR5, respectively. In addition, the input to differential amplifier $A_3$ is shorted out by normally closed contacts TR5-3 of timing relay TR5 and the input to differential amplifier $A_1$ is shorted out by normally closed contacts TR5-5 of timing relay TR5. This arrangement, coupled with the previously discussed function of TR5 in withholding power from the circuit 34 until timing relay TR5 times-out affords complete protection for the circuit 34 from the high frequency, high voltage ignition pulse.

Also, prior to the timing-out of timing relay TR5, the control circuit 34 is isolated from the drive circuit 16 for the servomotor 14 by the normally open contacts TR5-11 of the timing relay TR5. In the embodiment of the invention shown in the drawing, the plasma arc torch system includes a conventional automatic spacing control means 18 which means is connected to the drive circuit 16 through the normally closed contacts TR5-10 of timing relay TR5. Thus, prior to the timing-out of timing relay TR5, the spacing between the torch and the workpiece may be either manually controlled by the manual control means 17 or automatically controlled by the automatic spacing control of the prior art.

However, upon operation of timing relay TR5 after the plasma arc has been established, between the torch 11 and the workpiece 12, the normally open contacts of timing relay TR5 will close and the normally closed contacts thereof will open thus connecting the power supply 32 to the electronic circuit 34 through normally open contacts TR5-7, TR5-8, TR5-9, connecting the inputs to the amplifiers $A_1$ and $A_3$ by closing of normally open contacts TR5-1, TR5-2, TR5-4, TR5-6 and opening the shorting contacts TR5-3 and TR5-5. Simultaneously, the normally closed contacts TR5-10 open to disconnect the prior art automatic control means 18 from the drive circuit 16 and normally open contacts TR5-11 close to connect the output of electronic circuit 34 to the drive circuit 16 of the servomotor 14.

After the timing relay TR5 has operated, it will be seen that lead 50 is connected to one input of the differential amplifier $A_1$ through input resistors R1 and R3 and lead 51 is connected to the other input of differential amplifier $A_1$ through input resistors R2 and R4. The values of such input resistors, as well as of feedback resistor R5 and bias resistor R6, are selected to provide an output from amplifier $A_1$ which becomes more positive as the voltage between the input leads 50 and 51 increases. Similarly, the lead 53 is connected to one input of differential amplifier $A_3$ through input resistors R11 and R13, and the lead 52 is connected to the other input of differential amplifier $A_3$ through input resistors R10 and R12. The feedback resistor R14 and the bias resistor R15 for the differential amplifier $A_3$ are selected to provide an output signal that goes more negative as voltage between the leads 52 and 53 increases, the output from the amplifier $A_3$ is applied to one input of non-inverting amplifier $A_4$ having an input resistor R16 connected between the other input thereof and ground and a feedback resistor R17 selected to provide an output signal from amplifier $A_4$ which is of unchanged polarity with respect to the output signal of amplifier $A_3$.

Referring again to FIG. 2, it will be seen that the power supply 32 for the electronic circuit 34 provides a ground as well as a positive voltage and a negative voltage to such electronic circuit 34. Such ground and such positive and negative voltages provide the reference signals for sources $K_1$ and $K_2$ in order to enable the output signals of voltage and current sensors $G_2$ and $G_5$ to be rendered comparable to each other and to the reference signal provided by source $K_3$.

Thus, the negative voltage provided by the power supply 32 is connected to the input of the source $K_1$ and through a current limiting resistor R9 to a zener diode $Z_1$ and potentiometer P1 connected in parallel to ground. A selected portion of such negative voltage may therefore be obtained from potentiometer P1 and applied through input resistor R8 to the junction 22 at the input to summing amplifier $A_2$. The output of amplifier $A_1$ is also applied to junction 22 at the input of summing amplifier $A_2$ through input resistor R7. Thus, the output of summing amplifier $A_2$ will be a value directly related to the ground provided by the power supply 32 the magnitude of which will be determined by the magnitude of the output of amplifier $A_1$, the setting of potentiometer P1 and by the setting of the adjustable feedback resistor P2 which controls the gain of amplifier $A_2$. The sign of the output of amplifier $A_2$ will be an inversion of the summation of the output of amplifier $A_1$ and the reference from $K_1$.

Similarly, the positive voltage provided by the power supply 32 is applied to the input terminal of source $K_2$ and is applied through current limiting resistor R21 to potentiometer P3 connected in parallel with series connected diodes $D_1$ and $D_2$ to ground. A selected positive voltage from potentiometer P3 is applied through input resistor R19 to the junction 23 at the input of summing amplifier A5. The output of amplifier A4 is also applied to junction 23 at the input of amplifier $A_5$ through input resistor R18. Thus, the positive reference voltage from source $K_2$ is summed with the negative output signal from amplifier $A_4$ in summing amplifier $A_5$ to produce an output from summing amplifier $A_5$ with respect to the ground established by the power supply 32 the magnitude of which is set by the feedback resistor R20.

It will be seen that the outputs of summing amplifiers $A_2$ and $A_5$ are applied to the junction 24 at the input to summing amplifier $A_6$ through the input resistors R24 and R22, respectively. Since both signals are related to the ground established by the power supply 32 but are of opposite sign, it is possible to adjust the gain of the amplifier $A_2$ in such a way as to cause the magnitude of the output of summing amplifier $A_2$ to exactly match the output of summing amplifier $A_5$ thus producing a zero signal at the junction at 24. In other words, the outputs of summing amplifiers $A_2$ and $A_5$ are conditioned to cause them to be comparable to each other at junction 24.

The reference signal source $K_3$ actually comprises potentiometer P4 having one end connected to the positive voltage and the other end connected to the negative voltage provided by the power supply 32. The movable contact of potentiometer P4 may thus be adjusted to provide either a positive or a negative voltage at the junction at 24 through input resistor R23.

From the above it will be understood that when a plasma arc is established between a plasma arc torch 11 and a workpiece 12 with any given spacing therebetween, a particular relationship will exist between the voltage of the plasma arc torch power supply 13 and the current through the plasma arc which relationship may be sensed as described hereinabove to produce a positive or negative signal at the junction 24 representative of such relationship. Adjustment of the potentiometer P4 of source $K_3$ to provide a which will cancel the representative of such relationship at junction 24 will result in a zero output from the amplifier $A_6$ thus maintaining the particular spacing between the plasma arc torch 11 and the workpiece 12 which resulted in the relationship of current and voltage.

If the spacing between the torch 11 and workpiece should change during the performance of the desired operation on the workpiece as where the workpiece is warped or has an uneven surface, the current flow in the arc will increase or decrease inversely with respect to the change in spacing and the voltage across the arc will vary directly with changes in spacing. The changes in current and voltage of the arc will result in a positive or negative output from the amplifier $A_6$ which will be applied to the filter means $F_1$ in order to remove any AC components which may be present in the output of amplifier $A_6$.

As shown in FIG. 3, a filter means $F_1$ comprises a network of resistors R26, R27, R28 and capacitors C1 and C2 at the input of a further amplifier $A_7$. The output of amplifier $A_7$ of the filter means $F_1$ is applied both to the input of the amplifier means $G_8$ including input resistor R36 and amplifier A9 and to the input of the shutdown circuit 25. A feedback potentiometer P5 is included in the amplifier means $G_8$ connected between the input and output terminals of the amplifier $A_9$ in order to enable the output thereof to be matched to the input of the drive means 16 for the servomotor 14. As discussed hereinabove, the means 34 of this invention is related to the drive means 16 in such a way that an increase in spacing between the torch 11 and workpiece 12 resulting in a decrease in current flow through the arc and an increase in voltage across the arc will produce a signal to the drive means 16 which will cause the servomotor 14 to decrease the spacing between the torch 11 and the workpiece 12 and vice versa. Thus, the spacing between the plasma arc torch 11 and the workpiece 12, once set, will be maintained.

The shutdown circuit 25 comprises a dead band amplifier configuration which produces an output when the output of the amplifier $A_7$ of the filter means $F_1$ exceeds established limits in either the positive or the negative direction. This could happen for example, if the workpiece is so radically warped that it touches the torch before proper spacing can be maintained or if the torch leaves the end of the workpiece after completing an operation thereon. Thus the shutdown circuit 25 comprises a pair of diodes $D_3$ and $D_4$ connected in antiparallel to each other between the output of the filter means $F_1$ and the input of an amplifier $A_8$ through resistors R29 and R30, respectively. A negative bias is applied to the diode $D_3$ by means of potentiometer P6 and a positive bias is applied to diode $D_4$ through potentiometer P7. The gain of the amplifier $A_8$ is set by a feedback resistor R31 and the output of the amplifier $A_8$ is applied to the cathode and anode, respectively, of diodes $D_5$ and $D_6$. The anode of diode $D_5$ is connected to ground through series connected resistors R32 and R33 and the base of a PNP transistor Q1 is connected to the junction between resistors R32 and R33. The collector of transistor Q1 is connected to the negative voltage supplied by power supply 32 and the emitter of transistor Q1 is connected to ground through the winding of the relay CR4. Similarly, the cathode of diode $D_6$ is connected to ground through series connected resistors R34 and R35 and the base of a NPN transistor Q2 is connected to the junction between resistors R34 and R35. The collector of transistor Q2 is connected to the positive voltage supplied by the power supply 32 and the emitter of transitor Q2 is also connected to ground through the winding of the relay CR4. Thus, an output signal from the filter means $F_1$ which is either more negative or more positive than the biases established by the potentiometers P6 and P7 will cause one or the other of the diodes D3 or D4 to conduct, resulting in either a positive or a negative output from the amplifier A8. The occurrence of such positive or negative output from the amplifier A8 will cause either transistor Q1 or transistor Q2 to conduct thus energizing the relay CR4.

The energization of control relay CR4 will open normally closed contacts CR4-3 thereof, which are connected in series with the "Stop" switch 45 (see FIG. 2). Energization of relay CR4 will also close normally open contacts CR4-1 and open normally closed contacts CR4-2 thereof to transfer the control of the spacing of the torch 11 from the workpiece 12 back to the conventional automatic control means 18. It will be understood that the opening of normally closed contacts CR4-3 of relay CR4 will effect a complete shutdown of the system by deenergizing relay CR2 (see FIG. 2) in the same way that opening the normally closed "Stop" switch 45 will shut down the system.

It will be understood that the specific relationship between the voltage across a plasma arc and the current to such arc at a given spacing of the plasma arc torch 11 from the workpiece 12 will be a characteristic of the particular plasma arc torch power supply. Thus, a change in the setting of the plasma arc torch power supply 13 will result in a characteristic change in the current and voltage of the plasma arc. In the majority of cases, such characteristic relationship will remain essentially constant over the range of power supply settings and once the gain of the sensor means $G_2$ and $G_5$ and amplifier means $G_3$ and $G_6$ have been established, no further adjustments in the electronic circuitry 34 are required in operation and the spacing control will be relatively unaffected by changes in the setting of the power supply. Thus, it will be seen that the method and means of this invention provides an effective and versatile means of controlling the spacing between a plasma arc torch and a workpiece in operation and one which is substantially unaffected by conditions encountered in use. It is believed that those skilled in the art will find it possible to make various changes in the means for practicing the method of this invention as disclosed herein. For example, although the means of this invention employs a relay logic means 33 together with relay contacts at various inputs to the means for purposes of isolation during ignition of the arc, it is possible that at least some of such isolation could be provided by Hall effect devices or by other means. Similarly, various amplifier, filter and shutdown circuits are known and could be substituted for those shown and specifically described herein.

In many commercial applications it is desirable to use multiple plasma arc torches. In such multiple torch apparatus, each torch has its own power supply and individual ignition or sequence controls. Therefore, it would be necessary to use a separate means for practicing the method of this invention in connection with each such torches. This is because no two power supply torch combinations have identical characteristics and the gain of the electronic circuit 34 which make the means of this invention function as intended depend to a great degree upon the characteristics of the specific power supply when operating a specific torch. A single power supply 32 could supply more than one electronic circuit 34 but a separate relay logic means 33 would be required for each electronic circuit 34.

In single torch installations, the torch travel controls (not shown in the drawing) could also include a shutoff contact from the relay CR4 so that a high signal from the filter means $F_1$ would also result in shutdown of the travel of the torch. In multiple torch installations, it may be desirable to merely shut down an individual torch and shift the spacing control back to conventional means in order to permit the apparatus to operate with less than the total number of torches functioning because multiple torch apparatus generally use a gantry supporting all torches and the gantry is driven by a single travel motor.

Other combinations of the method of and means for automatically maintaining a given spacing between a plasma arc torch and a workpiece in accordance with the teaching of this invention with other control means used in commercially available plasma arc torch apparatus will be obvious to those skilled in the art.

What is claimed is:
1. The method of automatically maintaining a selected spacing of a plasma arc torch from the work surface of a workpiece comprising the steps of:
 a. establishing a plasma arc between said surface and said plasma arc torch at said selected spacing by means of a plasma arc torch power supply;
 b. electrically sensing the voltage present between said workpiece and said plasma arch torch and generating a first electrical signal representative thereof with respect to a given ground;
 c. electrically sensing the current flow between said workpiece and said plasma arc torch and generating a second electrical signal representative thereof with respect to said given ground;

d. electrically inverting one of said first and second electrical signals with respect to said given ground and electrically summing said inverted signal with a first selected reference signal to produce a first composite signal of given magnitude and sign with respect to said given ground;

e. electrically summing the other of said first and second electrical signals with a second selected reference signal to produce a second composite signal comparable in magnitude and opposite in sign to said first composite signal with respect to said given ground;

f. electrically generating a third selected reference signal equal in magnitude and opposite in sign to the difference between said first and second signals with respect to said given given ground at said selected spacing and summing said third electrical signal with said first and second composite signals to produce an electrical control signal representative of both the sense and the amount of any change in said second signal with respect to said first signal; and g. applying said electrical control signal to electromechanical means coupled to said plasma arc torch for moving said plasma arc torch toward said selected spacing from said work surface in response to said control signal.

2. The method of claim 1 including the additional steps of sensing the magnitude of changes in said electrical control signal and discontinuing said plasma arc upon occurrence of a change in said electrical control signal greater than a given magnitude.

3. Means for automatically maintaining a selected spacing between a plasma arc torch and the work surface of a workpiece comprising:

a. means establishing a plasma arc between said torch and said work surface of said workpiece including a first DC power supply providing given available power and capable of being internally set to supply selected percentages of said available power;

b. a second DC power supply independent of said first DC power supply, said second DC power supply providing a given ground and power at both positive and negative voltages with respect to said given ground;

c. means powered by said second power supply sensing the output voltage of said first DC power supply and producing a first electrical signal with respect to said given ground representative of the voltage sensed;

d. means powered by said second DC power supply sensing the output current of said first DC power supply and producing a second electrical signal with respect to said given ground representative of the current sensed;

e. means powered by said second DC power supply inverting one of said first and second electrical signals with respect to said given ground;

f. means powered by said second DC power supply for generating first and second selected reference signals of comparable magnitude and opposite sign with respect to said given ground;

g. first summing amplifier means powered by said second DC power supply summing said first electrical signal with the one of said first and second selected reference signals having the same sign to produce a first composite signal;

h. second summing amplifier means powered by said second DC power supply summing said second electrical signal with the other one of said first and second selected reference signals to produce a second composite signal;

i. means powered by said second DC power supply for generating a third selected reference signal with respect to said given ground equal in magnitude and opposite in sign to the difference between said first and second composite signals with respect to said given ground at said selected spacing between said plasma arc torch and said work surface of said workpiece;

j. third summing amplifier means powered by said second DC power supply summing said first and second composite signals with said third selected reference signal to produce an electrical control signal with respect to said given ground representative of the sum of said first and second composite signals with said third selected reference signal with respect to said given ground;

k. electromechanical means coupled to said plasma arc torch for moving said plasma arc torch toward and away from said work surface of said workpiece; and l. means applying said electrical control signal to said electromechanical means to cause said plasma arc torch to move toward said selected spacing of said plasma arc torch from said work surface of said workpiece.

4. Means for automatically maintaining a selected spacing between a plasma arc torch and the work surface of a workpiece as claimed in claim 3 including means for electrically isolating said means establishing said plasma arc from said means sensing said output voltage of said DC power supply and said means sensing said output current of said DC power supply during initiation of said plasma arc.

5. Means for automatically maintaining a selected spacing between a plasma arc torch and the work surface of a workpiece as claimed in claim 4 wherein said means for electrically isolating said means establishing said plasma arc from said means sensing said output voltage and said output current of said DC power supply comprises a relay logic means including a timing relay having contacts thereof interposed between said DC power supply and said means sensing said output voltage and said output current of said DC power supply.

6. Means for automatically maintaining a selected spacing between a plasma arc torch and the work surface of a workpiece as claimed in claim 3 including means sensing the magnitude of changes in said electrical control signal and means responsive to said means sensing the magnitude of changes in said electrical control signal for deactivating said means establishing said plasma arc upon occurrence of a change in the magnitude of said electrical control signal greater than a given magnitude.

7. Means for automatically maintaining a selected spacing between a plasma arc torch and the work surface of a workpiece as claimed in claim 3 including relay logic means comprising timing relays having contacts thereof interposed between said second DC power supply and all of said means other than said means establishing said plasma arc, said relay logic means being adapted to electrically isolate said second DC power supply from said means only during initiation of said plasma arc.

8. Means for automatically maintaining a selected spacing between a plasma arc torch and the work surface of a workpiece as claimed in claim 3 wherein at least one of said first and second summing amplifier means includes means for manually setting the gain characteristic thereof whereby a given relationship between the magnitude of said first and second composite signals after amplification may be maintained upon change in selected percentage of available power of said DC power supply.

* * * * *